May 10, 1927.
J. G. MACLAREN
1,628,607
CARRIER DISTRIBUTING AND SELECTING APPARATUS
Filed Feb. 21, 1925
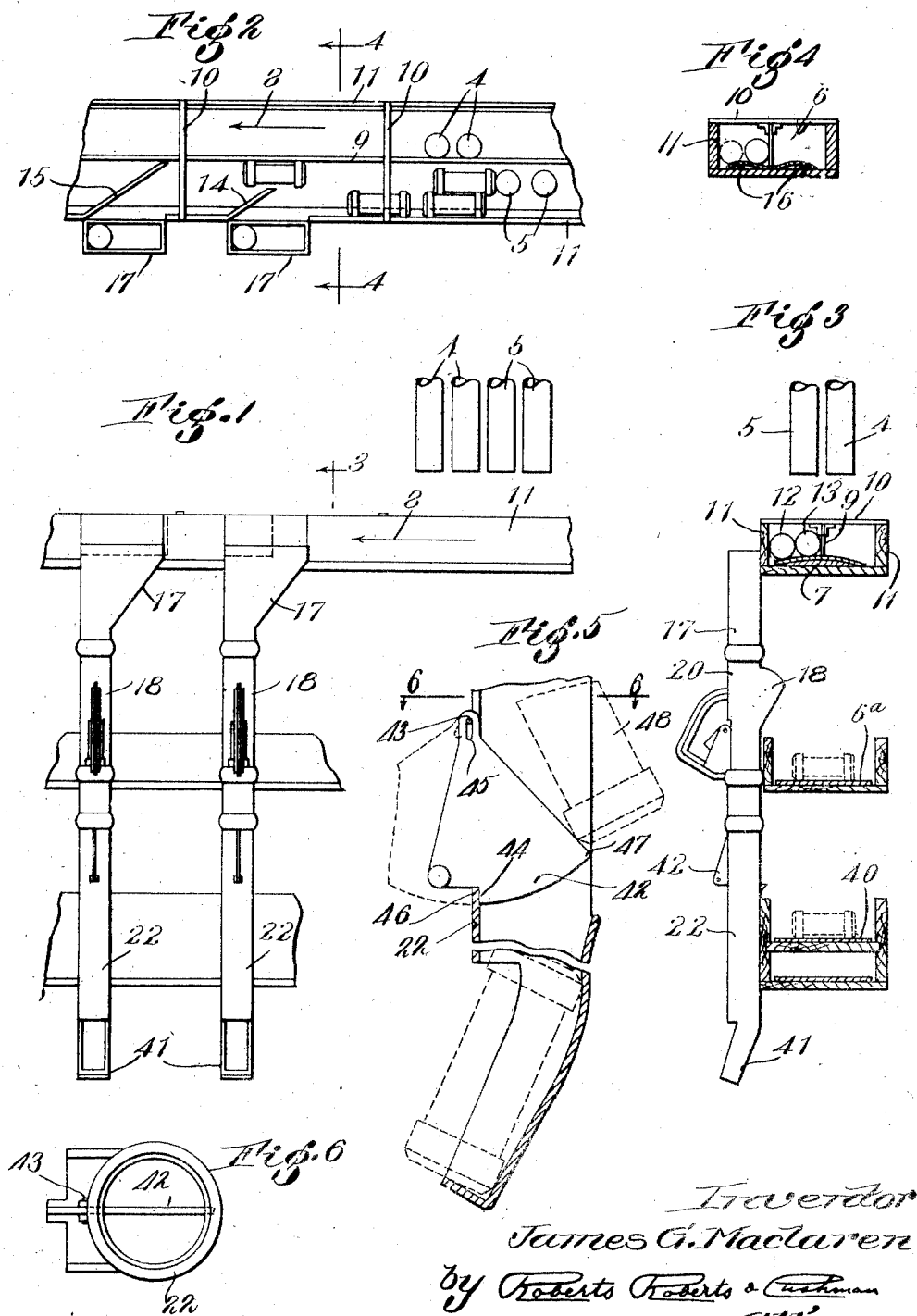
Inventor
James G. Maclaren
by Roberts Roberts & Cushman
Attys.

Patented May 10, 1927.

1,628,607

UNITED STATES PATENT OFFICE.

JAMES G. MACLAREN, OF SYRACUSE, NEW YORK, ASSIGNOR TO THE LAMSON COMPANY, OF SYRACUSE, NEW YORK, A CORPORATION OF MASSACHUSETTS.

CARRIER DISTRIBUTING AND SELECTING APPARATUS.

Application filed February 21, 1925. Serial No. 10,831.

This invention relates to carrier despatch apparatus and more particularly to means for sorting and distributing carriers of different classes and delivering the assorted carriers to different points. While the invention is illustrated as applied to a pneumatic despatch system, it is not necessarily restricted to such use but in many of its features is applicable to conveyor systems of other types. The present application is a substitute in part for my abandoned application, Serial No. 376,976, filed April 27, 1920.

The invention will best be understood by reference to the following description when taken in connection with the accompanying drawings in which,—

Fig. 1 is a fragmentary side elevation of a carrier distributing and sorting apparatus embodying the present invention;

Fig. 2 is a plan view of the apparatus shown in Fig. 1;

Fig. 3 is a vertical section substantially on the line 3—3 of Fig. 1;

Fig. 4 is a vertical section through the upper guideway of the apparatus, substantially on the line 4—4 of Fig. 2;

Fig. 5 is a fragmentary vertical section showing details of a distributing terminal forming part of the apparatus shown in Fig. 1; and Fig. 6 is a section substantially on the line 6—6 of Fig. 5.

Referring more particularly to Figs. 1, 2 and 3 of the drawings, the numerals 4 and 5 designate the delivery ends of carrier transmission devices, for example, pneumatic tubes, by means of which carriers are discharged into a conveyor guideway preferably having a moving belt as its floor. As indicated the tubes or other delivery devices designated by the numerals 4 and 5 may be divided into groups corresponding, for example to similar groups of remote sending stations, such groups of delivery terminals being adapted to deliver carriers into different parts of the conveyor guideway. While for descriptive purposes I have shown a belt conveyor as receiving carriers from the terminals 4 and 5, it will be obvious that a guideway or chute having a non-moving floor may be substituted for such belt. It will also be understood that the moving belt or belts, if such be employed, will be supported and driven in accordance with any of the usual methods employed in such apparatus.

The belt herein illustrated is flexible and is caused to assume an upwardly convex form by means of a board 7 (Fig. 3) over which it moves. The upper run 6 of this belt is assumed to be moving in the direction indicated by the arrow 8 (Fig. 1), its lower or return run 6ª moving in the opposite direction. While the upper and lower runs 6 and 6ª preferably form parts of a single continuous conveyor belt, they may if desired constitute separate and independent belts. The upper conveyor is divided into two tracks or ways by means of a partition 9 extending longitudinally of the belt 6, preferably midway between its edges, and which is supported by the cross pieces 10 carried by the side guards 11. While these parallel tracks or ways are shown as wide enough for but two carriers lying side by side, I wish it understood that this arrangement may be changed and that the invention is not restricted to the division of the conveyor into two such tracks only.

When a carrier is first discharged into the trough like conveyor guideway having the belt 6 as its floor it lands near the partition 9 due to the arrangement of the delivery terminals 4 and 5 closely adjacent to such partition. The carriers thus delivered tend to roll down toward the outer edge of the belt and to come to rest against the corresponding guard 11. If a carrier is already resting against the guard in the position indicated at 12, the newly arriving carrier will obviously be prevented from moving laterally out to the position 12 and will continue on substantially in the position indicated at 13.

Deflectors 14 and 15 of different lengths extend obliquely across the belt at spaced points longitudinally of the latter, the shorter of these deflectors being that which the carriers first approach. The upper run 6 of the belt is caused to assume a shape such as indicated in Fig. 4 in the neighborhood of the deflectors by means of rails 16 which at this part of the guideway take the place of the board 7.

These rails 16 so shape the upper surface of the belt as to cause a carrier positioned as shown at 13 in Fig. 3 to roll toward the partition 9 and thus to clear the end of the shorter deflector 14, although still maintained in position to engage the longer deflector 15. In this manner carriers may be directed into one or another of hoppers 17 disposed at the sides of the belt and which deliver the carriers to selector devices 18 of any desired type by means of which they are separated according to their classes as determined by their particular shape or other characteristics.

While in Fig. 2 the conveyor is shown as provided with hoppers and deflectors at one side only of the partition 9, it is to be understood that similar hoppers will be applied to the other side of the conveyor although not necessarily directly opposite to the hoppers herein illustrated. It is also contemplated as above suggested that the conveyor may be divided into more than two channels by means of additional partitions 9 and it is further contemplated that, if desired, the delivery terminals 4 and 5 may be arranged to deliver their carriers directly onto that portion of the belt which is provided with the rails 16.

A shown in Fig. 3, the selectors 18 are disposed above the lower run 6ª of the conveyor belt, so that carriers of one class emerging laterally from the separators fall onto the belt 6ª and are carried thereby to a suitable point of use, or delivery to other conveyor means.

Carriers passing straight on through the selector 18 ultimately arrive at the distributing terminal 22 where they may be delivered in either of a plurality of desired directions. For descriptive purposes I have shown a belt 40 and a pocket 41 for the reception of carriers.

In Figs. 5 and 6 the distributing terminal 22 is shown in detail to larger scale. This terminal comprises a carrier deflector 42 pivoted on a pin 43 and projecting through a narrow slot in the wall of the distributing terminal. This deflector has a shoulder at 44 adapted to engage the inside of the distributor terminal wall when the deflector is in operative position and when thus disposed arriving carriers will be deflected as indicated in dotted lines at 48 through a lateral outlet in the wall of the distributing terminal, such carriers falling onto the belt 40.

The deflector 42 has an elongate slot 45 taking over its pivot pin 43 thus permitting it to be lifted until its shoulder is clear of the wall of the distributing terminal at the point 46. The deflector may then be pulled out of the path of carriers moving through the terminal 22 and will remain in this inoperative position indefinitely by reason of the engagement of the lower end 47 of the deflector with the outside of the terminal wall. With the deflector in this position carriers may pass freely through the distributor terminal and are received in the laterally open pocket 41 at the lower end of such terminal. From this pocket the carriers may be removed by the operator as required. Manifestly the pocket 41 may be replaced by a delivery terminal of any desired form for discharging carriers onto a belt or other suitable type of conveyor.

Normally the deflector 42 is in the inoperative position but if the operator is unable to remove the carriers from the pocket 41 as fast as they are received she may set one or more of the deflectors 42 to switch arriving carriers onto the belt 40 by means of which they are delivered to other attendants provided to care for surplus carriers.

Assuming that carriers of two distinct classes, for example carriers having flat heads and carriers having recessed heads are delivered by all or any of the terminals 5, such carriers, whether of one or both classes will move along upon the belt and eventually will be diverted into one or another of the hoppers 17. The carriers of one class, for example those having recessed heads, are separated from the others in passing through the sorting devices 18 and all such carriers, being delivered onto the belt 6ª, may be conveyed at a common point, for example a charge authorizer's station. The carriers of the other class pass on down through the respective tubes 21 to the distributing terminals 22 where operators may be stationed to perform the desired transactions. If at any time an operator is temporarily absent or unable to care for all arriving carriers the deflector switch 42 may be set to divert carriers onto the belt 40, by means of which such carriers may be transferred to another operator's station.

Thus with a relatively small number of separators, carriers from a large number of delivery terminals may be separated into classes, carriers of one class being distributed to a plurality of operators' stations while carriers of another class are all transferred to a suitable point of discharge more or less remote from the points of discharge of carriers of the first class.

While I have herein shown and described a specific form or embodiment of my invention for illustrative purposes and have discussed and disclosed in detail the construction and arrangement incidental to one application thereof, it is to be understood that the invention is limited neither to the precise details or relative arrangements of parts nor to the specific embodiments herein shown, but that extensive deviations from the illustrated forms of the invention may be made without departing from the spirit thereof.

I claim:

1. A conveyor system comprising a guideway for articles to be transported, said guideway having spaced side walls, and means tending to cause articles moving along the guideway to take positions at one or the other side of the longitudinal center line of the guideway.

2. A conveyor system having a guideway for articles to be transported, said guideway having spaced side walls and comprising a floor higher near its longitudinal center line than at its lateral edges.

3. A conveyor system comprising a moving belt, fixed means extending longitudinally of the belt for raising a portion thereof above the level of the edge of the belt, and guard means extending along the edge of the belt.

4. A conveyor system comprising a guideway having spaced side walls and a belt conveyor as its floor and a rail disposed beneath said belt conveyor, the rail being spaced from the edge of the conveyor and lifting the latter to form a longitudinal ridge in the upper surface of the same.

5. A conveyor system comprising a guideway having spaced side walls and a belt conveyor as its floor, and an upwardly convex rail extending longitudinally of the belt and beneath the same to form a ridge in the upper surface of the floor of the guideway.

6. A conveyor system comprising a guideway having spaced side walls and a belt conveyor as its floor, means dividing said guideway into a plurality of parallel channels, and means forming a longitudinal ridge in the upper surface of the belt substantially midway of the width of each channel.

7. A conveyor system comprising a single guideway for articles to be transported, fixed means for deflecting articles from the guideway, means for moving certain articles along the guideway and past the deflecting means, and means disposed in the neighborhood of the deflecting means defining a path such that said articles pass the deflecting means without operatively engaging the latter.

8. A conveyor system comprising a guideway for articles to be transported, a deflector extending transversely of and part way across said guideway, means for moving articles along said guideway, and means disposed in the neighborhood of said deflector defining independent paths for different articles moving along the guideway, such paths being so arranged that certain articles are brought into engagement with said deflector while other articles are moved past the deflector without engaging the latter.

9. A conveyor system comprising a single guideway for articles to be transported, a plurality of fixed deflecting devices spaced along the guideway, means for moving articles along said guideway, and means disposed in the neighborhood of the deflecting devices defining independent paths for different articles moving along the guideway, such that certain articles are caused to engage one deflector and other articles are caused to pass the latter deflector and to engage another of the deflecting devices.

10. A conveyor system comprising a guideway having spaced side walls and a belt conveyor as its floor, a plurality of fixed deflectors projecting from one of said side walls, one of said deflectors being longer than the other, said side wall having an opening adjacent to each deflector, and means extending longitudinally of the belt conveyor in the neighborhood of said deflectors causing articles moving along upon the belt to divide into independent streams, the articles moving in the respective streams engaging different deflectors and being diverted thereby through the corresponding openings in the side wall.

11. A conveyor system comprising a guideway, fixed deflector means for diverting and discharging articles laterally from one side of the guideway at spaced points along the latter, means for receiving such deflected articles, for sorting them into classes, and for delivering the articles of different classes respectively to different points.

12. A conveyor system comprising a belt conveyor having upper and lower runs, means for delivering articles to one run of said conveyor to be moved thereby in one direction, means disposed at spaced points longitudinally of said first run of the conveyor for discharging articles therefrom, and means for dividing the articles so discharged at each of said points and for delivering certain of said articles to the other run of the conveyor.

13. A conveyor system comprising an endless belt conveyor having upper and lower runs upon one run of which articles of distinct classes are delivered, means for discharging articles of a plurality of classes laterally from that run of the conveyor to which they are first delivered as aforesaid, and means for sorting said articles discharged from the conveyor into their respective classes and for delivering one of said classes to the other run of the conveyor.

14. A conveyor system comprising an endless belt conveyor having upper and lower runs upon one run of which articles of two distinct classes are delivered, means for discharging articles of both classes at spaced points along the length of the conveyor and means for separating the carriers discharged at each of said points into their respective classes and for delivering all articles of one class onto the other run of the conveyor and for delivering articles of the other class at separate points corresponding to their points of discharge from the first named run of the conveyor.

15. A conveyor system comprising a guideway for articles of a plurality of classes, means for discharging articles of both classes from the guideway and for segregating them according to classes, means for receiving carriers of one class, a plurality of receivers for carriers of another class, and means for delivering carriers of the latter class to either of said receivers at will.

16. A conveyor system comprising a belt conveyor having an upper and a lower run, means for delivering carriers comprising two general classes onto the upper run of the belt, means for discharging groups of said carriers laterally from the belt at different points, means for separating the carriers after discharge into said two classes and for delivering all carriers of one class to the lower run of the conveyor belt, an independent conduit corresponding to each of said groups for guiding articles of the other class, a second conveyor for receiving articles from each of said conduits, a receiver associated with each of said conduits, and a switch device for each conduit for optionally delivering articles from any of said conduits to said second conveyor or to the receiver associated with the individual conduit.

Signed by me at Syracuse, New York, this 19th day of February 1925.

JAMES G. MACLAREN.